(12) United States Patent
Ritter

(10) Patent No.: US 7,734,507 B2
(45) Date of Patent: Jun. 8, 2010

(54) METHOD FOR DIRECTING A USER OF A MOBILE DEVICE FROM A CURRENT LOCATION TO A PRODUCT

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 1136 days.

(21) Appl. No.: 11/235,863

(22) Filed: Sep. 27, 2005

(65) Prior Publication Data

US 2006/0079247 A1 Apr. 13, 2006

(30) Foreign Application Priority Data

Sep. 28, 2004 (EP) .................................. 04104734

(51) Int. Cl.
*G06Q 30/00* (2006.01)
*G06F 17/30* (2006.01)
(52) U.S. Cl. .......................................... 705/26; 705/27
(58) Field of Classification Search .................. 705/1, 705/14, 26–28
See application file for complete search history.

(56) References Cited

U.S. PATENT DOCUMENTS

| 6,123,259 | A  | * | 9/2000  | Ogasawara | .............. | 235/380 |
| 2002/0178013 | A1 | * | 11/2002 | Hoffman et al. | .............. | 705/1 |
| 2003/0005160 | A1 | * | 1/2003  | Schaefer | .................. | 709/248 |
| 2003/0061001 | A1 | * | 3/2003  | Willins et al. | ............... | 702/153 |
| 2003/0095032 | A1 |   | 5/2003  | Hoshino et al. | | |
| 2003/0195820 | A1 | * | 10/2003 | Silverbrook et al. | .......... | 705/26 |
| 2003/0227392 | A1 |   | 12/2003 | Ebert et al. | | |
| 2004/0217166 | A1 | * | 11/2004 | Myers et al. | ................ | 235/383 |
| 2005/0075945 | A1 | * | 4/2005  | Hodge et al. | ................. | 705/26 |
| 2005/0097005 | A1 | * | 5/2005  | Fargo | ......................... | 705/26 |

FOREIGN PATENT DOCUMENTS

WO    WO 01/06401 A1    1/2001

OTHER PUBLICATIONS

"RFID: Riding On The Chip". Pat Russo. Frozen Food Age. New York: Dec. 2003. vol. 52, Iss. 5; p. S22 [recovered from Proquest on Jun. 15, 2009].*

* cited by examiner

*Primary Examiner*—Jeffrey A. Smith
*Assistant Examiner*—William J. Allen
(74) *Attorney, Agent, or Firm*—Pearne & Gordon LLP

(57) ABSTRACT

A method is described for directing a user of a mobile device from a current location to a product, wherein an identification code of the product is recorded in the mobile device and transmitted to a name server. The identification code is used in the name server among others for loading product-related data into the mobile device, e.g. a geographical location where the product can be bought. Following this, the user of the mobile device can go to said geographic location. For directing said user to the product, a direct contactless connection is established between said mobile device and a RFID element with which said product is marked, by using the same identification code or product-related data previously supplied by the name server.

32 Claims, 1 Drawing Sheet

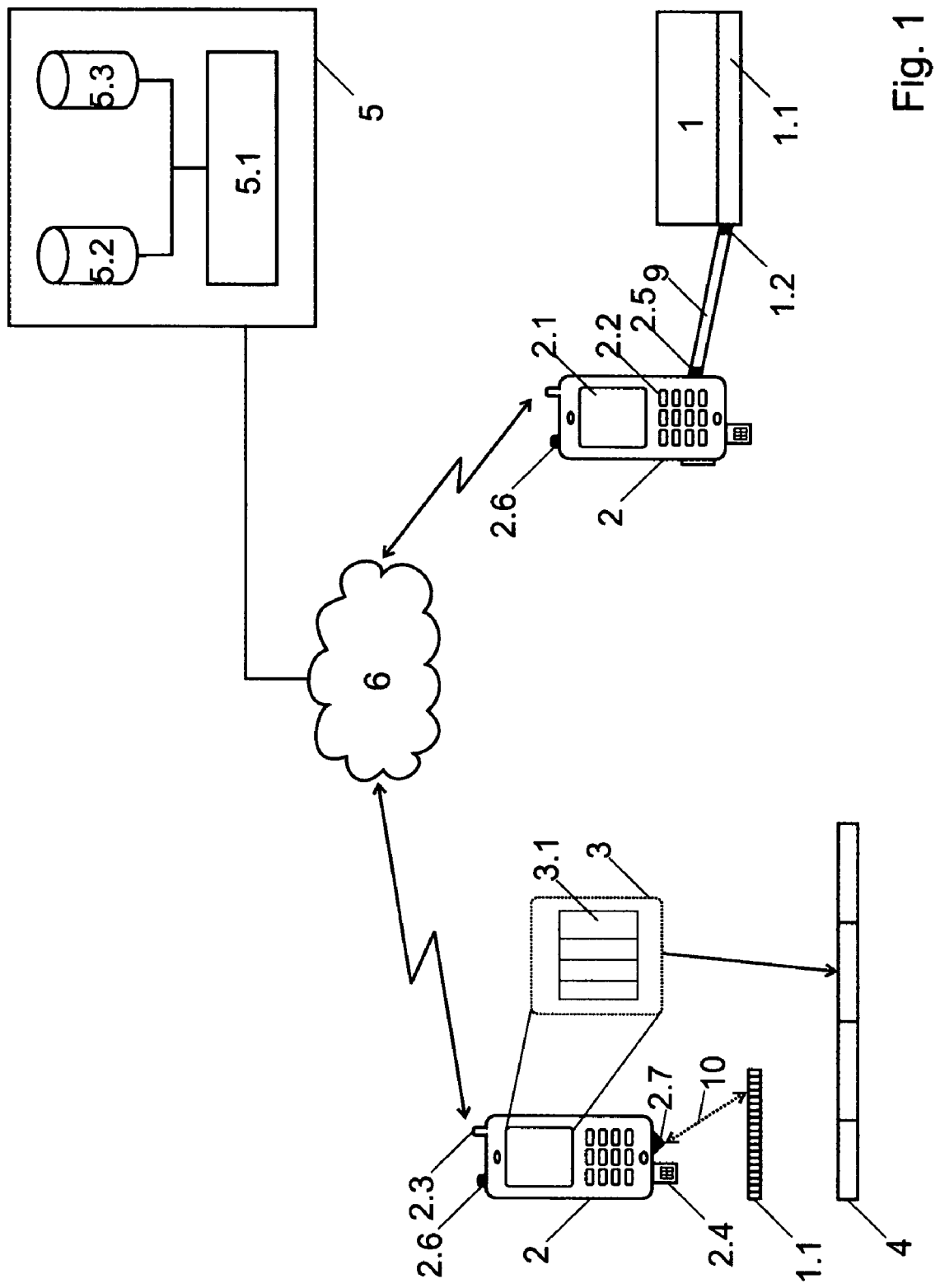

METHOD FOR DIRECTING A USER OF A MOBILE DEVICE FROM A CURRENT LOCATION TO A PRODUCT

REFERENCE DATA

This application claims priority of European patent application 2004EP-104734, filed on Sep. 28, 2004, the contents of which are hereby incorporated by reference.

FIELD OF THE INVENTION

The invention concerns a method for directing a user of a mobile device from a current location to a product according to the heading of patent claim 1.

RELATED ART

Nowadays, many products on the market are advertised for sale e.g. on websites and are available through online ordering and payment and through a possible subsequent delivery. It can also happen that an interested party (potential customer) needs the product as soon as possible and that a delivery from a sales point requires too much time, so that fetching the product personally in the shop would be more judicious. It can also happen that not all categories, prices, updates etc. of products are displayed, so that a visit in the shop remains recommended in order to find the correct product on the basis of a desired product type.

If the prospective buyer wishes to keep the travelling expenses to the shop as low as possible, a laborious search may indeed have to start since for example the address or the telephone number of the shop has changed or a good description of the shop's location is not available, etc. To solve such problems, the potential customer find his way with the Yellow Pages, information services, electronic road routers or even less suitable, possibly out-of-date tourist maps or street maps.

A further problem can also occur when reaching the shop, since an extensive search for the product is required, depending on the size or structure of the shop, in particular if too little serving staff is available.

Once he finally gets near the product, the potential customer then possibly learns that the product is sold out. Even more annoying it is to learn that only a single product is in stock, but cannot be found in the shop.

One remaining alternative is to look for another similar product in the hope that it will also be suitable. Since too little or even no serving staff is available, immediate guidance is excluded. The customer, left to his devices, must inspect the product category in order to possibly make a good choice resp. not to find anything. The potential customer thus looses valuable time. Finally, the prospective buyer would have preferred visiting another shop, but the latter might have been too far away in view of the imminent closing time. A further geographical search would have been necessary since the customer maybe does not exactly know where the shop is located and which is the fastest route to get there.

BRIEF SUMMARY OF THE INVENTION

It is an aim of this invention to propose a method for directing a prospective buyer from a current location to a product, wherein the prospective buyer is a user of a mobile device and through which all the disadvantages from the prior art can be avoided.

This aim is achieved with a method having the characteristics of claim 1.

Advantageous further embodiments of the invention are indicated in the dependent claims.

The fundamental idea of the invention is a method based on a method for directing a user of a mobile device from a current location to a product with the following steps:
   an identification code of the product is recorded in the mobile device and transmitted to a name server
   the identification code is used in the name server to download data pertaining to said product into the mobile device,
   said product-related data including at least a geographical location in whose vicinity a product can be bought,
   said user goes to said geographical location,
   to direct said user to the product, a direct contactless connection is established between said mobile device and a RFID element with which said product is marked, by using the same identification code or product-related data previously supplied by the name server.

A first advantage of this method lies in the direct geographical directing of the user from his current location to the product pickup location. No serving staff is required since the product itself can be found immediately in the shop by activating the RFID element, even if the product is on the wrong shelf or in storage.

If the product, just at that moment, is sold or possibly stolen, the user is immediately informed of this and need not waste his time in the shop.

In this case, the inventive method can be initiated a further time in that the unsuccessful user requests in the current shop per mobile device a further connection to a further product. This could be an identical product or a search for a similar product. In the latter case, the current shop might have a similar product and the customer is immediately directed thereto. If not, the search for other shops offering the original or a similar product continues.

An availability test can also be launched by the mobile device by querying an internal inventory server for monitoring existing products in the new shop, e.g. by using the previous or a differing identification code in connection with RFID elements recorded there.

If this availability test is connected with a cashless prepayment of the product by means of the mobile device to a payment institute of the shop, a reservation can be notified to the inventory server and the RFID element can possibly be immediately deactivated so that in an extreme case a further customer who turns up in the meantime might have to leave the product at the till so that the first customer does not miss the desired product again.

With great advantage now and in future, mobile devices, such as mobile telephones or PDAs (Personal Digital Assistant), will have or more generally offer always more and more powerful functions that will allow the method steps described above to be performed easily and fast. For example, positioning means such as GPS, Galileo, etc. as well as route finders in mobile telephones for directing the user to a shop are already used. External mobile-network-based orientation means are also conceivable, e.g. by means of triangulation signals for determining the location of the mobile telephone in the mobile network. Furthermore, data transmission formats have already been developed with which the user of the mobile telephone can receive the direction information through a display or a loudspeaker over the mobile network.

When entering a covered shop, current GPS systems requiring a possibly transparent direct connection with satellites fail. A geographical mobile-network-based orientation would be too expensive to install in the shop. This is why RFID elements used for marking products, i.e. also fastened or allocated exactly to the product, are very well suited. For this purpose, the customer can use a RFID reader with which a RFID-element-based route description to the product is carried out. In principle, RFID elements present within a range of e.g. 10 m are activated and notified to the user's RFID reader. If the RFID reader is linked or at least connected with the mobile device, the route description can even be reproduced by means of conventional visual display means on the mobile telephone or e.g. by means of acoustic sounds or by means of a voice. It is highly probable that in future such RFID readers will be available as a standard on mobile telephones.

If the product in the shop is located outside the range of the RFID reader device, RFID-network-based search means can be used. For this, searches can be launched from one or several RFID elements if the RFID reader receives not the searched but a non-searched RFID element. Such activations of RFID elements distributed in the shop for looking for a further removed targeted RFID element are known for ad-hoc networks. In this case, for example, three RFID elements capable of communicating with one another can determine different running time differences of own test signals relatively to one another and can naturally be located accurately also relatively to the user's location in the shop. It is also possible to install intermediary devices in the shop that take on a regular registration of the RFID elements so that the shop can control its stock through automatic and permanent inventory adjustments. If the products are transported back and forth within the shop for logistic reasons respectively by the customers themselves, it is possible to monitor the location and/or the movement of all the products. The efforts for allocating the products in the shop are made easier or are no longer necessary. A wrong logistic organization of a product on its shelf also becomes completely unproblematic with a mobile device to the great advantage for the searching customer.

Such ad-hoc networks or intermediary devices can also initiate an inhibiting of the purchasing authorization of this product through another customer (at least provisionally), for example by adding at inventory data additional sales interdiction data to the data content of the RFID element read at the till.

BRIEF DESCRIPTION OF THE DRAWINGS

An embodiment of the invention will be described hereinafter in more detail with the aid of the FIGURE, which shows:

FIG. 1: a diagrammatic concept of an application of the inventive method.

DETAILED DESCRIPTION OF THE INVENTION

FIG. 1 describes an example for directing a user of a mobile device 2 from his current location to a product 1 that can be picked up in a shop.

The user has recorded in advance from a magazine, from the Internet or from further media information sources an identification code, e.g. an electronic product code 1.1 (EPC=Electronic Product Code) or a barcode 11. Such codes can also be recorded directly by the mobile device, e.g. contactlessly over an infrared or Bluetooth interface or by means of other recording means such as an optical barcode reader 2.7 with e.g. a laser scanner 10 or an RFID reader 2.5 of an RFID element affixed to a product 1 with a product code, e.g. an EPC code 1.1 or a further code 1.2 derived from the product. For recording such codes, corresponding reader devices can be connected directly to the mobile device. In future, most mobile devices such as mobile telephones will also have several integrated reader devices. Currently, many mobile telephones have for example infrared, WLAN and/or Bluetooth interfaces as well as cameras. An identification code can also be entered directly with the keyboard 2.2 of the mobile device 2, as for conventional mobile telephones. The prospective buyer can of course also use instead of a mobile device another (preferably external) recording device for reading the code, such as for example a laser scanning unit that could be connected to a computer at home or even to a searching station in the shop. Alternatively, it is also possible to select a code from an HTML page or from a PML page, i.e. without reader device, in case the prospective buyer wishes to perform an Internet search of the product 1, for example with an EPC search mask of a database. This Internet search can also be carried out via a mobile device in case the mobile telephone allows an Internet access or a WAP connection. This aspect is very advantageous if the user of the mobile telephone has not found the product in a first shop and initiates from there a further search according to the inventive method. Reproducing means of Internet pages on the display of a mobile telephone are currently standard for example when visiting WEB or WAP pages. Finally, an identification code (such as EPC, barcode . . . ) of the product 1 is recorded and stored in the mobile device. A further option consists in storing several identification codes in case the prospective buyer wishes to be directed to several products like for a shopping list or to a product from a product category. These codes can then be transmitted to a name server.

After recording the electronic identification code 1.1 and if this code indicates the geographic location of a shop, the prospective buyer can start to be directed to the shop, e.g. through activation of road direction means (e.g. with GPS, Galileo, mobile network based locating system . . . ) in the mobile device.

If the identification code (e.g. an EPC code) has no explicit geographic data of the product, it is forwarded to a server 5. The forwarding can occur from the mobile device over a mobile radio network 6 such as GSM, GPRS, HSCD, EDGE, UMTS etc. or over a fixed network by using an internet fixed line access connected to a modem (over a telephone fixed network, Powerline network, cable TV network, etc.).

One application in the mobile device can request a confirmation of the user before the code is processed any further and the desired geographic data of the shop are reproduced. This confirmation can be given for example over the keyboard of the mobile device, such as a PDA, over other input means or with a voice command.

If the password is correct and the confirmation is received, the read code 1.1 is packed by the application into a message (for example in a short message or preferably in a GPRS or UMTS packet) and sent over the mobile radio network 6 to a server 5 to a known address, preferably a server within the infrastructure of the mobile radio network 6. The message is optionally signed and/or provided with a time stamp by the mobile device 2 or by a SIM card 2.4 connected with the mobile device 2.

The server 5 administers messages with codes that are received by several or possibly all RFID readers 2.5 of different potential customers (=users of mobile devices). Other, more complex filters can be provided in the server 5 for processing codes from different areas differently or not at all.

The server 5 can also verify the user's identity. This is all the more reliable if the server 5 is administered by the operator of the mobile radio network 6. In this case, the identity of the mobile user can be determined reliably on the basis for example of the IMSI (International Mobile Subscriber Identity) or of another identity in the SIM card. In this manner, user-dependent information can be reproduced, for example indications depending on the profile and the preferences of the user.

The server 5 is connected over Internet or an Intranet with a name service server 5.2 in which for each page a corresponding electronic address of an electronic page is stored.

A query with the code just received is forwarded by the server 5 to a name service server 5.2 that replies with a corresponding electronic address. The electronic address consists for example of a URL or another address for a TCP-IP network.

The name service server 5.2 can be administered by the operator 5.1 of the server 5 and/or by external entities (for example by an organization that distributes the codes 1.1. to different companies). Several name service servers 5.2 can be connected together so that the desired address is searched in another name service server if it is not located in the server 5. This allows for example a mobile radio network operator to process also codes from other organizations.

The user of the mobile device 2 can thus always direct all codes of all product manufacturers to the same target server 5 that determines from the name service server 5.2 or the network of name service servers 5.2 the address of the page from which the desired geographical location or further information can be downloaded.

The link in the name service server 5.2 between a code 1.1 and an address can preferably be modified at any time by the supplier of the desired service (for example over a dedicated WEB form). This allows an electronic address of a page or of a domain to be changed without having to inform the end users.

The address of the page on which the geographic information of the shop is located can thus be found clearly alone on the basis of the 64 or 96 bits codes that are stored in the RFID element 1.2; the page which is accessed is thus totally independent on the address or telephone number of the server 5. Since many products 1 must be marked, and since not all codes 1.1 can be used, it is necessary to provide sufficient freely available bits for the codes; simple IP numbers for example could possibly not be sufficient since already many possible combinations have already been allocated. Another, independent page addressing system (e.g. the EPC system) is preferably used.

The server 5 receives the reply from the name service server 5.2 with the desired page address and access the corresponding page in the further server 5.3 or a network with several local or remote servers (with further queries and replies).

In one variant embodiment, the address of the desired page ensues from a combination of the address indicated by the name service server 5.2 together with one or several bits of the code 1.1. In this case, the address in the name service server 5.2 corresponds to a range in which the individual pages correspond to certain parts of the code. This has the advantage that the design of the name service server 5.2 can be simpler.

The page in the server 5.3 which is accessed by the server 5 possibly comprises a Hypertext content in a Markup language. In a variant embodiment, this page comprises an XML content (extended Markup Language). In another variant embodiment, the page comprises a PML content (Product Markup Language). The page can also support SOAP-protocol (Simple Object Access Protocol), NET-Framework or other web services with which the server 5 and finally the mobile device 2 can access services and objects of the further server 5.3 from which the desired geographic information of the shop can be determined.

The server 5 downloads the desired page, or part of the page, from the further server 5.3 and forwards it to the mobile device 2. As will be described further below, the page on the further server 5.3 can also include a multimedia content, in order for example to reproduce geographical information or directions also acoustically or with images. It is also possible that the desired information is spread over several pages that can be linked together for example with links, so that the user can download more information about a product by clicking or selecting links or menu options.

The desired information of the product's location can depend on parameters determined within the mobile radio network 6 and/or the mobile device 2, including on the identity of the user of the mobile device 2, on his type of contract, on his location, on the time, on the visited network and on his profile, etc. The language of the determined content can depend on the user's location and/or on his previously filed profile.

The desired information can be transmitted over a return channel, for example as message (SMS, MMS, USSD or e-mail) or as WEB or WAP page to the mobile device 2 and/or to the SIM card 2.4. In one embodiment, among others the shop's location with the route description from the user's current location is reproduced, for example by the display of the mobile device 2. In this case, data pertaining to the shop's location coordinates can be stored in the further server 5.3 to serve, in connection with the user's current location, for generating the route description.

The shop's location coordinates can also be communicated to the user within a session with several user queries and corresponding replies. In one embodiment, an indication is stored in the server 5 or in the further server 5.3 that the desired information has been sent to the user, in order also to be able to prove this later on. This indication can be signed electronically and provided with a time stamp.

The following desired information for directing the user to the product are stored on a page in the further server 5.3 and transmitted over the mobile radio network 6 to the mobile device 2:

Location (world coordinates, address, country) of the shop with the desired product (from there, knowing the location of the mobile device, a distance between the user and the location can be determined dynamically and displayed with the mobile device).

Contact data of the shop: telephone number, fax number, e-mail, website, catalogue with references (also as barcode, EPC code of RFID elements) of products or product categories, departments, persons, etc.

Opening times of the shop.

Product-related data, such as computed availability of the product or products (number of remaining products in the shop, possibly with RFID code list), product price, product age resp. best-before date . . . .

Possibility of reserving (possibly remote-controlled with the mobile device) resp. prepaying (possibly remote-controlled with the mobile device) a product.

Possibility of preparing (possibly remote-controlled with the mobile device) a shopping basket of one or several products, e.g. for a fast pick-up in the shop.

Allowed payment means in the shop resp. possibility of cashless (possibly remote-controlled with the mobile device) payment.

General business terms of the shop and possibly of the product manufacturer.

Further information can stay stored on the page of the server 5.3 and can always remain accessible.

From a read barcode of a product in a newspaper or on Internet, several EPC codes of products can also be attributed to the same product category (e.g. one code for a wine category, each bottle of wine of this category having its own EPC code). In this case, an EPC code is allocated to the user when accessing the wine category by means of a read barcode. If the user then wishes to get this product but not the neighboring product of the category, he can request with his mobile device that a new EPC code (of another bottle of wine of the wine category) be selected. This exchange operation of an EPC code could be initiated with the mobile device 2 of the user and take place in the server 5.3 where all EPC codes with certain categories are collected.

In a similar manner, the server 5.3 can classify products of different producers and corresponding EPC codes in categories (such as for instance car, coffee machine, red wine . . . ) or at least establish a connection between pages of these products according to categories (such as car, coffee machine, red wine . . . ) according to the desired criteria (such as price, size, performance, quantity . . . ). The user of the mobile device 2 can thus make a more refined selection on the basis of a basic idea about the desired product, before actually going for example to a shop with a product that is possibly outdated for him. The same applies in the shop itself, wherein an exchange of EPC code between two products or a set of EPC codes of several products can be sent to the mobile device. This aspect is particularly important if the customer wishes to be informed about several products or if the customer opts at the last second for another product.

After sending the identification code from the location of the mobile device's user to the server 5 with the name server 5.2, the identification code of the desired product is stored in the mobile device. An alternative is conceivable if the name server 5.2 or the further server 5.3 sends back to the mobile device other product-related data instead of, or in addition to, the identification code. On the display of the mobile device, the user can select e.g. by means of graphical or text menus one or several codes or data. For example, for EPC-based identification codes, EPC search masks 4 are shown directly on the display 3. With this, the user can select a product or a product category as well also as the location of the shop where he wishes to go to buy the product.

For selecting the shop's location, different selection parameters relating to a product or to a product category from the server 5 resp. from PML pages can be displayed in the mobile device. Selection parameters must be understood as being for example the distance between the mobile device and the shop, the product price etc.

If the owner of the mobile device wishes to record a list of identification codes of sought products in the mobile device, it is possible to load from the name server a list with a minimal number of product-related locations that have some of these products.

If a list of identification codes of sought products is recorded in the mobile device, a list of locations that have some of these products, e.g. sorted according to the most advantageous product-related price offers, can be downloaded from the name server. Further selection criteria of the locations (shops) can be used here, such as for example a minimal total travel distance covering all shops or a route that offers only the underground and no road traffic. It is also possible to search for the location where most products in a list are cheapest and/or where parking spaces for cars are available. In the case of several shops, it is further possible to take into account other availability criteria of products on the list. A recommended route description from one shop to one or several other shops can also be done according to certain selection criteria (e.g. no stretch of motorway, only main roads, no underground but only bus line as well as minimal distance between shops or circular route between house, first shop, second shop, etc., last shop and back home, etc.).

Usually the user of a mobile device will go shopping regularly. It thus also makes sense to store a user profile of selection criteria for example in the mobile device (e.g. with cookies) or in a server or in a database. With this, desired products as well as selection criteria relating thereto can simply be used several times, like the customer usually wishes. For example, a drinks shop within only a radius of 10 km from the user's home, where it is possible to park a car directly in front of the entrance to load the goods and where it is possible to pay by credit card, is sought. Additional selection criteria such as for example the name of a preferred supermarket chain can be added for example as further profile for the same or other sought products.

After choosing the selection parameter or parameters (i.e. the desired shop is now known in the mobile device), the user of the mobile device can start his way to the shop. The route can be computed from the location information e.g. from a PML page of the shop in the server 5 and the current world coordinates of the mobile device in the mobile device or with an additional navigation module. Current navigation systems (such as GPS, Galileo or mobile network-based orientation systems) can also be connected to mobile devices or are integrated therein. The data of the route description can also be transmitted from the mobile device to the navigation system of a car.

Upon arrival of the user of the mobile device in the shop, the mobile device 2 with a RFID reader 2.5 will make possible the user's navigation to the product 1.

The mobile device 2 comprises a RFID reader element 2.5 or is connected with such a reader element (for example over a USB, Firewire, PC-card, Compactflash, proprietary etc. connection or over a Bluetooth or WLAND contactless connection). The reader element 2.5 comprises a micro-controller and at least one antenna or coil in order to exchange contactlessly data with RFID components in the immediate vicinity. The data transmission occurs for example in the frequency range 13,56 MHz, 900 MHz and/or 860-930 Mz. The reader element can preferably optionally work in different frequency ranges and with different RFIDs. The range for reading the RFIDs is preferably between 2 and 10 meters—depending on the orientation of the reader element and of the RFID element. The connection occurs preferably in half-duplex mode with an ASK backscatter modulation.

The product 1 comprises an RFID element 1.1 with a non-erasable permanent memory area in which a code is stored during manufacture or during personalization. The code preferably corresponds to the product code (e.g. EPC code) that was given in the name server or that builds a code derived from this code. It is thus an identification code or data previously supplied by the name server that can be made up as any code. The code preferably identifies univocally each particular RFID element in the shop; each EFID element preferably has another individual code. It is however also conceivable that the code designates only the type of the product, in particular if the user of the RFID reader seeks a product category or a product from a group of identical products (e.g. glasses). The code is preferably non-falsifiable.

The EPC codes preferably comprise 64, 96 or more bits and are organized hierarchically. The reply of the element 1.1 to a query of the reader element 2.5 preferably includes a header, redundant verification data and the code. Other data can be stored in the memory area of the chip and read by the reader element 2.5.

EPC codes are preferably distributed by a common authority to different product manufacturers; part of the cod preferably indicates the identity of the producer of the product 1. A producer wishing to mark products with further indications will reserve a series of codes with the common authority and stores part of these codes in the RFID element.

At least one application is provided in the mobile device 2 for reading codes in neighboring RFID elements over the reader element 2.5. Reading a code is preferably initiated by the mobile device 2; it is for example possible that the mobile device always or periodically searches for neighboring RFID elements and reads and processes or forwards codes in found RFID elements. In another, current-saving embodiment, reading is initiated by the user of the mobile device 2, who launches a corresponding application or enters a command if he wishes to find a certain product. Upon picking up or paying the product, the RFID element resp. the product or its availability can be blocked and unblocked only after reading the code with a command from a remote server.

Reading the RFID elements with the mobile device 2 or with another device can also be initiated by an external device (for example a point of sale or an automatic vending machine) over an interface at close range (for example Bluetooth or WLAN) over the mobile radio network 6 or over a link on a visited WEB or WAP page.

Simple filtering and processing means can be provided as part of the application in the mobile device 2 and/or in the reader element 2.5 for processing read codes. The application can for example process and forward only certain parts of codes—e.g. for searched product categories. Redundancy verifications can also be provided in order to delete implausible and erroneous codes. Already used codes are preferably stored in a database in the mobile device for the purpose of future checking, statistical evaluation and backup.

A further direction of the user from the location of said user to the product in the shop is performed by using the identification code or product-related data of the sought product that was recorded directly with the mobile device. If the mobile device with RFID reader of the user is within reach of the product, the RFID element is activated. By measuring the running time, a distance between the mobile device and the product can be determined. By further measuring the running time with other neighboring RFID elements, further distances can be determined. If the mobile device and two RFID elements build triangles, it is possible to determine from these triangulating distant points two-dimensional coordinates of the mobile device relative to the sought product resp. a search direction. Altogether, it is thus possible to determine a distance and a direction by means of the mobile device and two RFID elements.

If the mobile device with the RFID reader is outside the range for activating the sought RFID element, other measures must be taken into consideration. A direct connection between the mobile device and the sought element is thus not possible.

Different identification codes of several active RFID elements closely situated to the mobile device can be recorded in the user's mobile device and allow said user, through corresponding reproducing means, to find his way to the product on the basis of his mobile device. A connection between the RFID reader and one of these codes will of course show that these RFID elements correspond to other products than the sought product. However, a running time measurement between the mobile device and one or several of these RFID elements can be performed even if the EPC code is uninteresting. If two such running time measurements are carried out with other RFID elements, the two-dimensional position of the mobile device relatively to one of the—unfortunately not sought—RFID elements is determined.

On the other hand, localizing the sought RFID element by means of a relay-based network can be initiated.

It is possible to use as relay-based network a so-called ad-hoc network capable of being self configured with linkable RFID elements, by initiating from at least one of the RFID elements close to the mobile device (and thus capable of being activated) a search for RFID elements until the sought RFID element is found. The topology of the ad-hoc network can be determined in advance dynamically (e.g. through interim running time measurements between network elements). For each search step from one RFID element to the next, running time measurements can be carried out so that the position of a checked RFID element in relation to another as well as to one RFID element close to the mobile device (i.e. capable of being activated) is known. The two or three-dimensional position, i.e. the distance and direction, of the mobile device relatively to the found RFID element of the sought product, is thus determined. All in all, relative positions of the mobile device to RFID elements can always be determined through triangulated running time measurements (between the mobile device and RFID elements at close range to these RFID elements as well as between RFID elements in their vicinity). One possible method is e.g. a hop-by-hop search between RFID elements.

If the relative position is known by recording several running time measurements between the mobile device and an RFID element over the ad-hoc network, the position of the sought product resp. the route description to the product can be shown on the display of the mobile device.

An alternative to searching for an RFID element situated far away from the mobile device (i.e. incapable of being activated directly) consists in establishing a connection of the user's mobile device with at least one fixed-based relay where the sought RFID element and its position in the shop are known. Such relays can be used for inventorying as well as for controlling product movements in the shop. The knowledge of the RFID element as well as its position come through directly activating the RFID element from the relay resp. from the fixed-based relay over further RFID elements lying in-between. If the mobile device stands in connection with the relay, a running time measurement between the mobile device and the relay as well as a further running time measurement with any other RFID element is sufficient for determining the location of the mobile device relatively to the sought product.

If the relay includes a router or if it stands in connection with a router, data pertaining to the location of the sought product in the shop and coming from the fixed-based relay can with great advantage be transmitted to the mobile device. In other words, the router transmits e.g. a WEB or a WAP page with a route description between the sought product and the mobile device after the above-described localizing of the sought product relatively to the mobile device has been performed. If the router also knows inaccessible places in the shop, a more accurate route description with a possible resp. optimized secondary route is computed, wherein the customer for example knows exactly when he has to turn off between two shelves. This is particularly important if many walls or long stretches between storage locations make short trips to the product impossible. Relays can also be installed e.g. at staircases or on the floor/on the ceiling between storeys so that directing the customer to the product over several storeys is unproblematic. If an RFID element is not found on one storey, the search is continued on the next storey and so on. Per storey a graphical representation of inaccessible zones of the shop (preferably for walls, shelves, tills etc.) can also be sent from an HTML or PML page of the shop to the mobile device and represented on the display of the mobile shop as background to the route description. Additionally, distances, e.g. with text ("you are still 52 m away from the RFID element") or with a gauge bar ("you have completed 50% of the originally queried distance") and directions (e.g. with arrows or a diagram of the route), can be shown graphically on the display of the mobile device or reproduced acoustically.

If the owner of the mobile device in the shop wishes to record in the mobile device a list of identification codes of sought products, an optimum route, e.g. with minimal resp. optimized distance between the user and all locations where the products are to be found, is loaded e.g. from a router or from a server of the shop. The aim thereof is to lead the user in the shop as fast as possible to the product. On the other hand, the shop manager can also integrate a certain direction of the customer (e.g. in front of new advertisement objects) in the computed route to the sought product.

In a shop in which products are arranged according to categories, a search for products can be made for example according to these categories, i.e. an EPC code of a category is recorded by the customer or is proposed to the customer in a menu. This is particularly useful if the customer wishes to have a simple overview of a product category. Further more selective codes to a category of products can be recorded or confirmed in the mobile device when at the location of the category (of products), and the customer can, on the basis of more selective activation of RFID elements or always more selectively by means of geographical data of further product-related data, continue going to a sought product or unexpectedly to another desired product. Such a search can be performed most easily when the customer walks around in the shop through progressive category-related activation of EPC codes. A product category-related activation of EPC codes an also be made through an ad-hoc network between EPC codes for categories of products. In other words, a product category and its EPC code can be derived from the EPC code of a product. Furthermore, a server (e.g. in connection with relays distributed in the shop for monitoring the RFID elements) can manage all locations of categories of RFID elements up to the location of an individual RFID element of a product. If in a shop no classification of products is made according to categories, an isolated sought product is still found.

The inventive method thus makes it possible to search for a product in a shop, even if it is not in the right place. This also means that the shop logistics with respect to classification of products is greatly simplified. In the case of lacking classification of products in the shop, a good overview e.g. for inventory purposes or generally for monitoring available or sold products can be ensured. The shop's serving staff can, by means of a mobile device, inform a customer without mobile device where exactly he has to go to find his product as fast as possible. The method is very well suited for a shop where many product movements are necessary, where many different but badly distinguishable products are offered or where products are placed in a fully random manner.

From home, at friends', at work, on the street or in a shop, a potential customer can perform an availability test (e.g. availability, number of available items) with his mobile device by means of recording an identification code of a desired product, if inventory data for instance updated from a PML page of the shop are available to him over the mobile network. If the availability test is positive, it is additionally possible to reserve the desired product for example from the mobile device or from another communication unit e.g. with query menu of the PML page. The reservation can further be made for example through prepayment over the mobile device.

The invention claimed is:

1. Method using a name server in combination with a mobile device for directing a user of the mobile device from a current location to a product, comprising the steps of:
    recording an identification code of the product in the mobile device;
    transmitting said identification code, using the mobile device, to a name server,
    downloading, using the server utilizing the identification code, product-related data into the mobile device, wherein said product-related data includes at least a geographical location in whose vicinity a product can be bought, and
    said user visiting said geographical location directing said user at said geographical location to the product using said mobile device by establishing a direct contactless connection between said mobile device and a RFID element with which said product is marked using the identification code or product-related data previously supplied by the name server, wherein
    said RFID element is affixed to said product and is read by a reader element connected to said mobile device.

2. Method according to claim 1, wherein the mobile device can record a number, a barcode and/or an EPC code.

3. Method according to claim 1, wherein connections between the mobile device and the name server occur over a mobile network.

4. Method according to claim 1, wherein several possible locations of the product are made known to the user.

5. Method according to claim 1, wherein further product-related data including one or more of: a distance between the user and the location, an address of the location, an opening time of the location, a price of the product, an authorized payment means at the location, a computed availability of the product or products, a product age, and/or a sell-by date are made known to the user in addition to the location of the product.

6. Method according to claim 5, wherein product-related data are stored in PML pages of different sales points in a database connected with the name server.

7. Method according to claim 1, wherein in order to make known several locations for the product, determining criteria, previously given by the user, are used in the mobile device for selecting a location, wherein said determining criteria are defined by criteria of distance between the mobile device and the sales point and/or additional product-related criteria.

8. Method according to claim 7, wherein in order to select one of the notified locations in the mobile device, acoustic and/or visual reproducing means and manual and/or acoustic input means are used.

9. Method according claim 1, wherein directing the user to the location of said product is shown on the mobile device as a route description by means of a GPS or Galileo navigation system or a GSM-based network for localizing the mobile device and from the known geographical product-related data.

10. Method according to claim 1, wherein in order to further direct the user from the geographical location of a shop having said product to the product, the mobile device records identification codes or product-related data by activating at least one RFID element.

11. Method according to claim 10, wherein different identification codes of several active RFID elements are recorded by the user's mobile device, which allow said user through corresponding reproduction means to find the product with the mobile device.

12. Method according to claim 11, wherein codes from a category of products are first recorded in the mobile device and then further product-related data on the basis of the geographical data lead always more selectively to the product.

13. Method according to claim 10, wherein a graphical representation of inaccessible zones of the shop includes one or more of: walls, shelves, and/or tills, from a HTML or PML page of the shop is sent to the mobile device.

14. Method according to claim 10, wherein distances, with text or with a gauge bar, and directions with arrows or a diagram of the route, between the mobile device and the product are shown graphically on the display of the mobile device or reproduced acoustically.

15. Method according to claim 1, wherein, if there is no direct connection between the mobile device and the RFID element of the product, a localizing of the RFID element is initiated by means of a relay-based network.

16. Method according to claim 15, wherein an ad-hoc network adapted for being self configured with linkable RFID elements is used.

17. Method according to claim 16, wherein a relative position of the mobile device to RFID elements is determined through triangulated running time measurements.

18. Method according to claim 15, wherein a connection of the user's mobile device with at least one fixed-based relay is established, where the RFID element and its position in a shop having the product are known.

19. Method according to claim 18, wherein the relay includes a router or is connected with a router,
that transmits data for orienting towards the product in the shop to the mobile device and,
that if necessary, if knowing the position of the mobile device, computes and sends to the mobile device an auxiliary route between the mobile device and the product.

20. Method according to claim 1, wherein a list of identification codes of products is recorded in the mobile device and a list with a minimum number of product-related locations that have some of these products is loaded from the name server.

21. Method according to claim 20, wherein further selection criteria for downloading a desired list of locations are downloaded from the name server.

22. Method according to claim 1, wherein a list of identification codes of products is recorded in the mobile device and a list of locations where the products can be bought most advantageously is loaded from the name server.

23. Method according to claim 1, wherein a list of identification codes of products is recorded in the mobile device and a list of locations with the shortest distance between the user and the respective locations of these products is loaded from the name server.

24. Method according to claim 1, wherein at a location of several products, within a single shop, an optimized route search to the products is controlled by a server, wherein the server knows the location of the RFID elements in the shop.

25. Method according to claim 1, wherein at a location of several products, within a single shop, an optimized route search is initiated by means of an EPC code of a category of products and pursued by means of more selective codes for determining the location of a RFID element of the product in the shop.

26. Method using a name server in combination with a mobile device for directing a user of a mobile device to a product in a shop, comprising the steps of:
accepting product information associated with the product from a user of said mobile device for storing in said mobile device;
transmitting said information over a network, using said mobile device, to a name server,
downloading, using the name server utilizing the product information, product-related data into said mobile device, wherein said product-related data includes at least a geographical location of the shop where the product can be obtained to aid the user in finding the shop,
the user visiting the shop using said mobile device for determining the location of the product in the shop by establishing a contactless connection between a reader connected to said mobile device and an RFID element affixed to said product, and
directing the user to the location of the product in the shop using said mobile device.

27. Method according to claim 26, wherein said connection between said RFID element and said mobile device utilizes a relay-based network.

28. Method according to claim 27, wherein said relay-based network utilizes an ad-hoc network adapted for being self configured with linkable RFID elements is used.

29. Method according to claim 28, wherein a relative position of the mobile device to RFID elements is determined through triangulated running time measurements for directing the user.

30. Method according to claim 27, wherein the relay-based network includes a router, or is connected with a router, which transmits data for directing the user to the product in the shop to the mobile device.

31. Method according to claim 30, further comprising the steps of computing and sending to the mobile device an auxiliary route between the mobile device and the product.

32. A system for directing a user of a mobile device to a product in a shop, said system comprising:
a communication network;
a mobile device for accepting product information associated with the product from a user of said mobile device;
transmitting said product information over the communication network, using said mobile device; and
a server connected to said communication network, said server adapted for receiving said product information from the mobile device and further adapted to respond to said receiving by transmitting, utilizing the product information, product-related data over said communication network to said mobile device, wherein said product-related data includes at least a geographical location of the shop where the product can be obtained to aid the user in finding the shop, wherein
said mobile device is adapted to communicate said geographical information to the user, and wherein
said mobile device is further adapted for, in response to the user visiting the shop, determining the location of the product in the shop by establishing a contactless connection between a reader connected to said mobile device and an RFID element affixed to said product for directing the user to the location of the product in the shop.

* * * * *